US010565228B2

(12) United States Patent
Heidel et al.

(10) Patent No.: US 10,565,228 B2
(45) Date of Patent: Feb. 18, 2020

(54) TESTING DATABASE REPLICATION WITH MULTI-CONTAINER SYSTEM ARCHITECTURE

(71) Applicant: SAP SE, Walldorf (DE)

(72) Inventors: Martin Heidel, Walldorf (DE); Michael Muehle, Walldorf (DE); Reiner Singer, Schriesheim (DE); Johannes Haeussler, Laudenbach (DE); Timo Hochberger, Heidelberg (DE); Mohamed Ali Chriki, Leimen (DE); Sascha Bastke, Heidelberg (DE)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 15/451,322

(22) Filed: Mar. 6, 2017

(65) Prior Publication Data
US 2018/0253481 A1    Sep. 6, 2018

(51) Int. Cl.
*G06F 17/00* (2019.01)
*G06F 16/27* (2019.01)
*G06F 11/14* (2006.01)
*G06F 11/36* (2006.01)

(52) U.S. Cl.
CPC .......... *G06F 16/27* (2019.01); *G06F 11/1469* (2013.01); *G06F 11/3688* (2013.01); *G06F 11/3696* (2013.01); *G06F 16/273* (2019.01); *G06F 16/275* (2019.01); *G06F 2201/80* (2013.01)

(58) Field of Classification Search
CPC ............................ G06F 16/27; G06F 11/1469
See application file for complete search history.

(56) References Cited

U.S. PATENT DOCUMENTS

| | | | | |
|---|---|---|---|---|
| 2010/0250491 A1* | 9/2010 | Jin | .......................... | G06F 16/27 707/634 |
| 2010/0262633 A1* | 10/2010 | Bhattacharjee | ......... | G06F 16/22 707/812 |
| 2014/0344236 A1* | 11/2014 | Xiao | ................... | G06F 16/2358 707/696 |
| 2016/0196320 A1* | 7/2016 | Borowiec | ............. | G06F 3/0608 707/624 |

* cited by examiner

*Primary Examiner* — Hung Q Pham
(74) *Attorney, Agent, or Firm* — Jones Day

(57) ABSTRACT

Testing a database replication system within a multi-container system architecture comprises receiving a first request for creating a database recovery system within a multi-container system architecture. The multi-container system architecture is configured to contain a plurality of tenant databases and a system database, and the database recovery system includes a primary system and a secondary system. The primary system is then identified from the information in the first request. Upon identification, a first tenant database included in the plurality of tenant databases is determined that corresponds to the identified primary system. Upon determining the first tenant database, a second tenant database of the plurality of tenant database is generated that corresponds to the secondary system, and which is enabled to test replicating information that would otherwise be associated with the first tenant database. Related apparatus, systems, techniques and articles are also described.

20 Claims, 7 Drawing Sheets

… (US 10,565,228 B2)

TESTING DATABASE REPLICATION WITH MULTI-CONTAINER SYSTEM ARCHITECTURE

TECHNICAL FIELD

The subject matter described herein relates in general to field of computer database systems. More specifically, the disclosed subject matter relates to a multi-container system architectures and use of multi-container system architectures in the context of testing database replication and recovery.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter and as part of its recovery efforts, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

In one aspect, provided herein are methods for testing a database replication system within a multi-container system architecture. Related apparatus, systems, techniques and articles are also described. In some embodiments, the method includes receiving a first request for creating a database recovery system within a multi-container system architecture. The multi-container system architecture is configured to contain a plurality of tenant databases and a system database, and the database replication system includes a primary system and a secondary system. The method includes identifying the primary system from information included in the first request In response to identifying the primary system from the information included in the first request, a first tenant database included in the plurality of tenant databases is determined that corresponds to the identified primary system. In response to determining the first tenant database, a second tenant database of the plurality of tenant databases is generated. The second tenant database corresponds to the secondary system and is enabled to test replicating information that would otherwise be associated with the first tenant database.

In some embodiments, the method further comprises receiving a second request for accessing the secondary system. In response to receiving a second request for accessing the secondary system, the second request is executed based at least in part on data included in the second tenant database and the results of executing the second request are outputted. In some embodiments, executing the second request is based at least in part on information in the system database. In In some embodiments, the method further comprises receiving a third request for accessing the primary system and in response to receiving a third request for accessing the primary system, the third request is executed based at least in part on data included in the first tenant database, and the results of executing the third request is outputted In some embodiments, executing the third request is based at least in pan on information included in the system database.

In some embodiments, the method further comprises sending log information from the first tenant database to the second tenant database, and replaying the log information at the second tenant database In some embodiments, the log information comprises a metadata log.

In some embodiments, the step of generating the multi-container system architecture comprises generating the system database and the first tenant database. In some embodiments, the step of generating the second tenant database of the plurality of tenant databases comprises replicating information associated with the first tenant database, and storing the replicated information in the second tenant database.

In some embodiments, the replicated information comprises data pages, log buffers and metadata or any combination thereof. In some embodiments, the multi-container system architecture comprises a plurality of index servers including a first index server and a second index server, and wherein the first index server hosts the first tenant database, and the second index server hosts the second tenant database.

In some embodiments, the first index server stores topology information associated with the first tenant database, and the second index server stores topology information associated with the second tenant database In some embodiments, the topology information associated with a tenant database of the plurality of tenant databases includes: information corresponding to tables associated with the tenant database, and information corresponding to table partitions associated with the tenant database.

In some embodiments, the multi-container system architecture comprises a name server, and the name server hosts the system database, stores information associated with the first tenant database, and stores information associated with the second tenant database In some embodiments, information stored in the name server includes landscape information associated with the multi-container system architecture. In some embodiments, the information stored in the name server does not include topology information associated with a tenant database of the plurality of tenant databases. In some embodiments, the first tenant database is configured to communicate with client applications through a read/write connection. In some embodiments, the second tenant database is configured to communicate with client applications through a read-only connection.

In another aspect, a computer-implemented system for testing a database replication system within a multi-container system architecture is provided herein that comprises one or more data processors and a computer-readable storage medium encoded with instructions for commanding the one or more data processors to perform any of the methods disclosed herein.

In yet another aspect, computer program product for testing a database replication system within a multi-container system architecture is provided herein that includes a non-transitory machine-readable medium storing instructions that, when executed by at least one data processor, cause the at least one data processor to perform any of the methods disclosed herein.

Non-transitory computer program products (i.e., physically embodied computer program products) and/or non-transitory computer-readable storage media are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc. Related apparatus, systems, techniques, and articles are also described.

The subject matter described herein provides many technical advantages. Advantages of the subject matter described herein may include that a multi-container system architecture simplifies the setting up testing a database replication system. In particular, this architecture allows for a single installation compared to a database replication system including a separate primary and secondary system, which requires at least two installations. In addition, a multi-container system may run on a single host computer, while the primary system and the secondary system of a database replication system typically run on two separate hosts and not on the same host. Thus, a multi-container system architecture proves more cost-effective and time-efficient for developers to implement their client applications and then test the applications' performance in a database replication and/or recovery setup. A multi-container system architecture, therefore, represents a single, self-contained solution across various platform, whether installed in-memory or outside memory, for testing complex replication and recovery scenarios for database systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
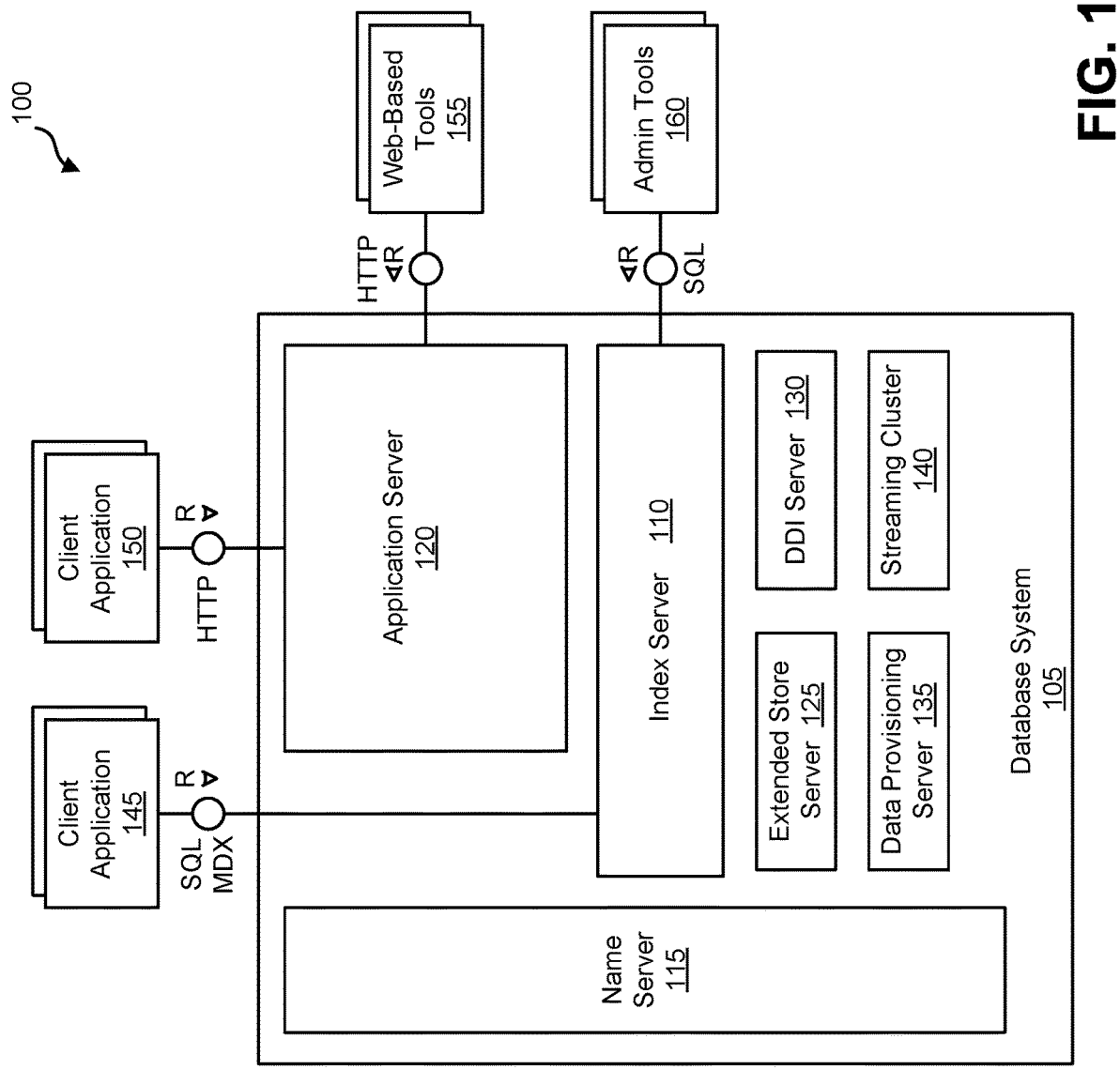
FIG. 1 is a system diagram illustrating an example database system for use in connection with a metadata catalog.

For many of their client applications, database systems may be required to support operations on a 24/7 schedule, and database systems may be required to provide a guaranteed maximum amount of downtime, during which a database system is not able to fully support ongoing operations. When a system is required to ensure an agreed level of operational performance, it may be referred to as a high availability system ("HA").

Hot-standby systems are typically used to to guarantee substantially continuous uptime with no, or very little, downtime. A hot-standby system, or a backup system, is a database system that may be activated quickly in the event of a disruption causing one or more functions of a primary operational database system to fail. Such a disruption may be referred to as a disaster, and the process of restoring a database system to full operations may be referred to as disaster-recovery ("DR").

Some databases may utilize replication to improve reliability and availability of the database. If data replication is implemented, the database system may include a first datacenter and a second datacenter. The first datacenter may include a processor and memory sufficient to store the data associated with the database. The first datacenter (or primary system) may store a first (primary) copy of the data associated with the database. The second datacenter may also include a processor and memory sufficient to store the data associated with the database. The second datacenter (or secondary system) may store a second (backup) copy of the data associated with the database. In some implementations, the database may include more than two datacenters (e.g., three or four datacenters).

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the workload between the two systems (known as load balancing). Such a situation may be referred to as Active/Active (AA) operation since the first datacenter and the second datacenter both actively respond to queries at the same time.

Logging is then typically used to communicate data or metadata between a primary database system and the various additional systems or for restoring a database system recovering from a disaster. Logging refers to creating and maintaining a log that lists any changes to the state of a database system. For example, logging can be used to prevent loss of persistent data in a database system.

Some database systems, such as SAP HANA®, support multiple isolated databases in a single database system. These isolated databases are referred to as multitenant database containers or tenant databases within the overall system or multi-container system architecture. Thus, a database system or system architecture in multiple-container mode is capable of containing one or more tenant databases. In some embodiments, a multi-container system architecture can be converted to a single-container system that includes only one tenant database. A multi-container system architecture, therefore, allows implementing and testing a database replication system in a single, stand-alone solution without the need for two separate systems, one of which being the primary and the other the secondary system.

The subject matter described herein discloses apparatus, systems, techniques and articles that may provide a multi-container system architecture for implementing and testing database replication systems within a single, stand-alone solution that proves more cost- and time-efficient for developers to test their client applications with database replication systems. In some examples, apparatus, systems, techniques and articles disclosed herein utilize a first tenant database included in the multi-container system architecture to represent the primary system a second tenant database for the secondary, backup systems.

Database Systems

FIG. 1 is a diagram 100 illustrating a database system 105 that can be used to implement aspects of the current subject matter, according to some embodiments. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
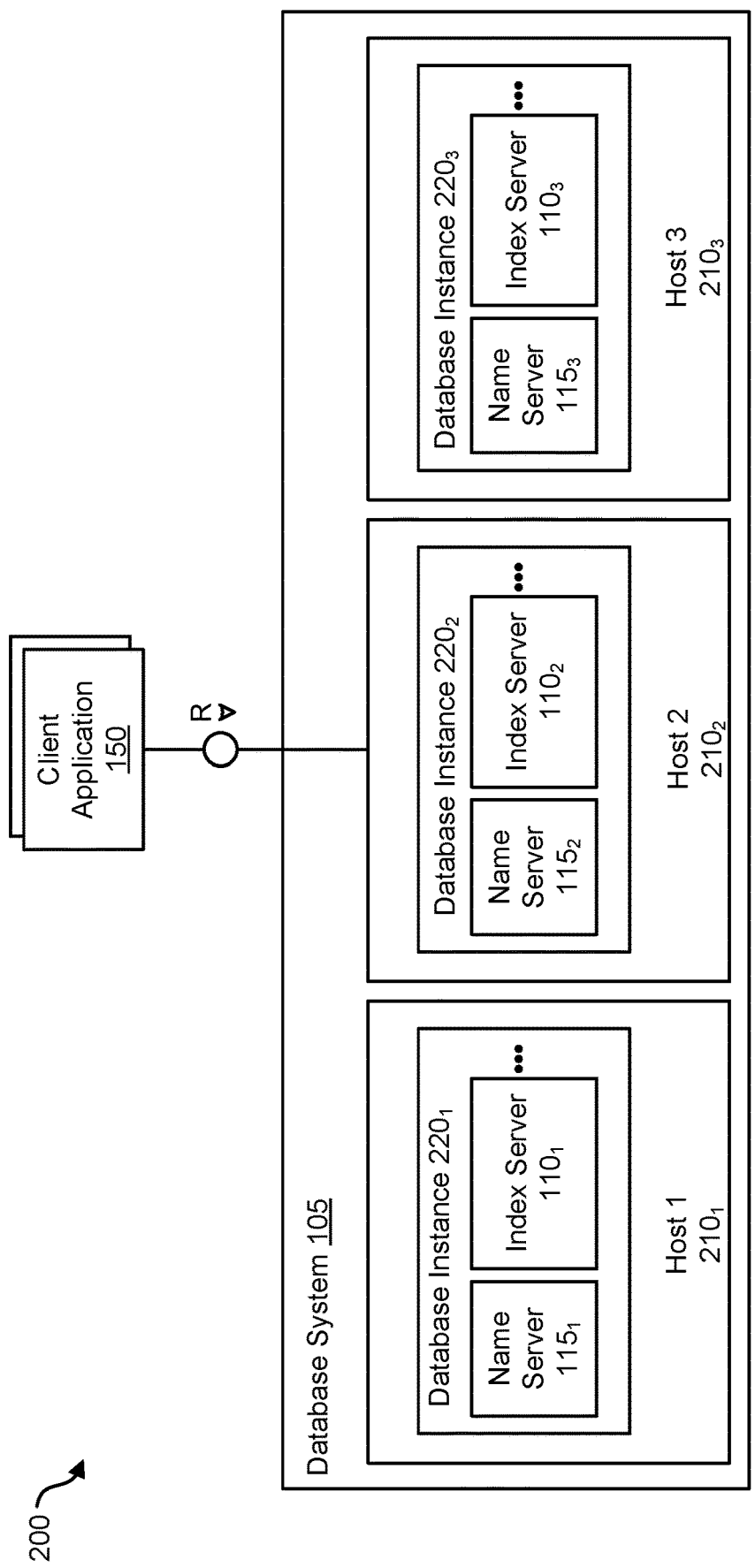
FIG. 2 is a system diagram illustrating a distributed database system having a plurality of database instances for use in connection with a metadata catalog.

FIG. 2 is a diagram 200 illustrating a variation of the database system 105 that can support distribution of server components across multiple hosts for scalability and/or availability purposes, according to some embodiments. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Index Server

Figure 3:
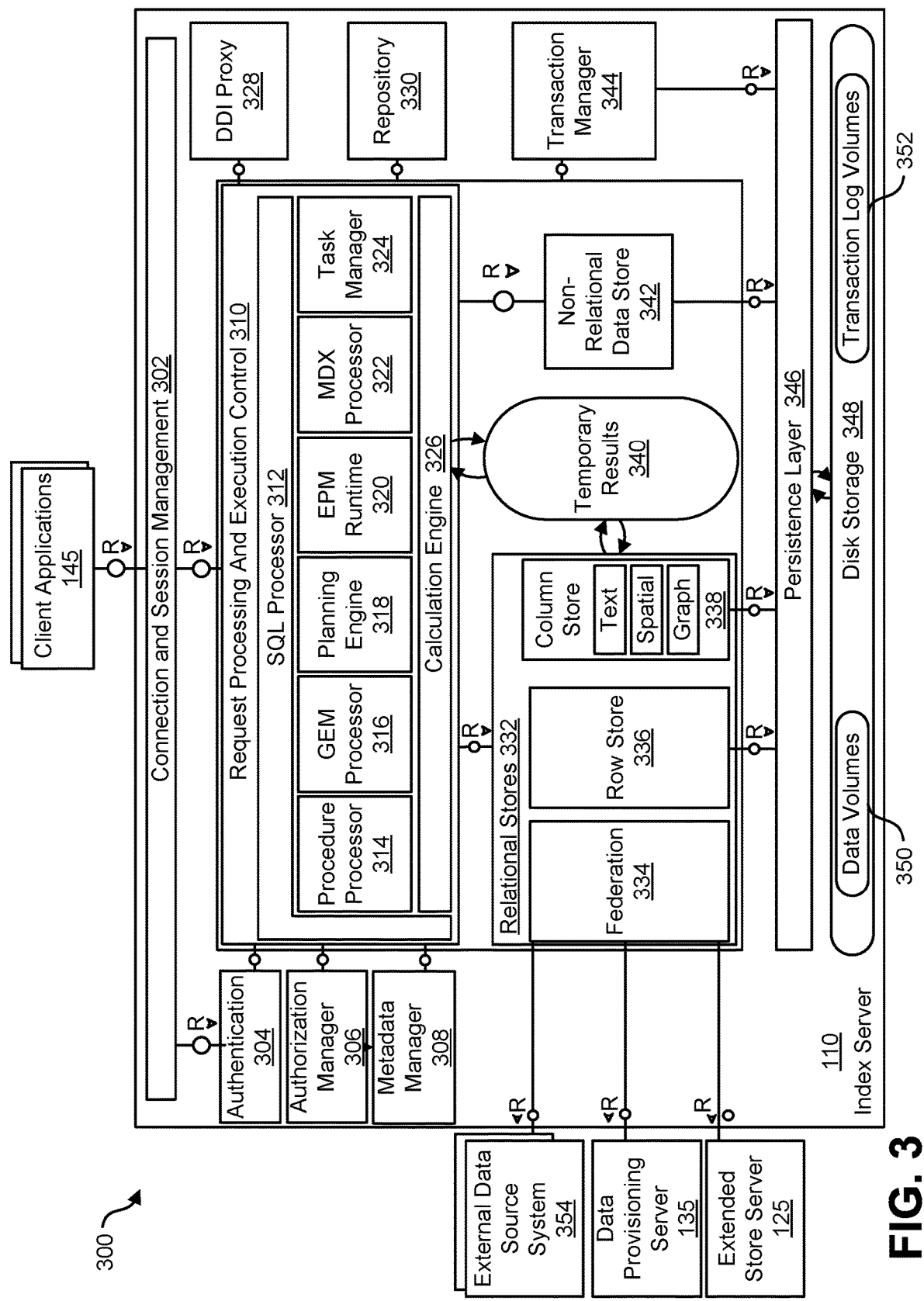
FIG. 3 is a system diagram of an index server forming part of the database system of FIG. 1.

FIG. 3 is a diagram 300 illustrating an architecture for the index server 110 (which can, as indicated above, be one of many instances) forming part of the database system of FIG. 1, according to some embodiments. A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems and multi-component systems, central metadata can be shared across servers (and tenant databases), and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persistent objects can be loaded via their persistent object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persistent data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Database Replication Systems

Figure 4:
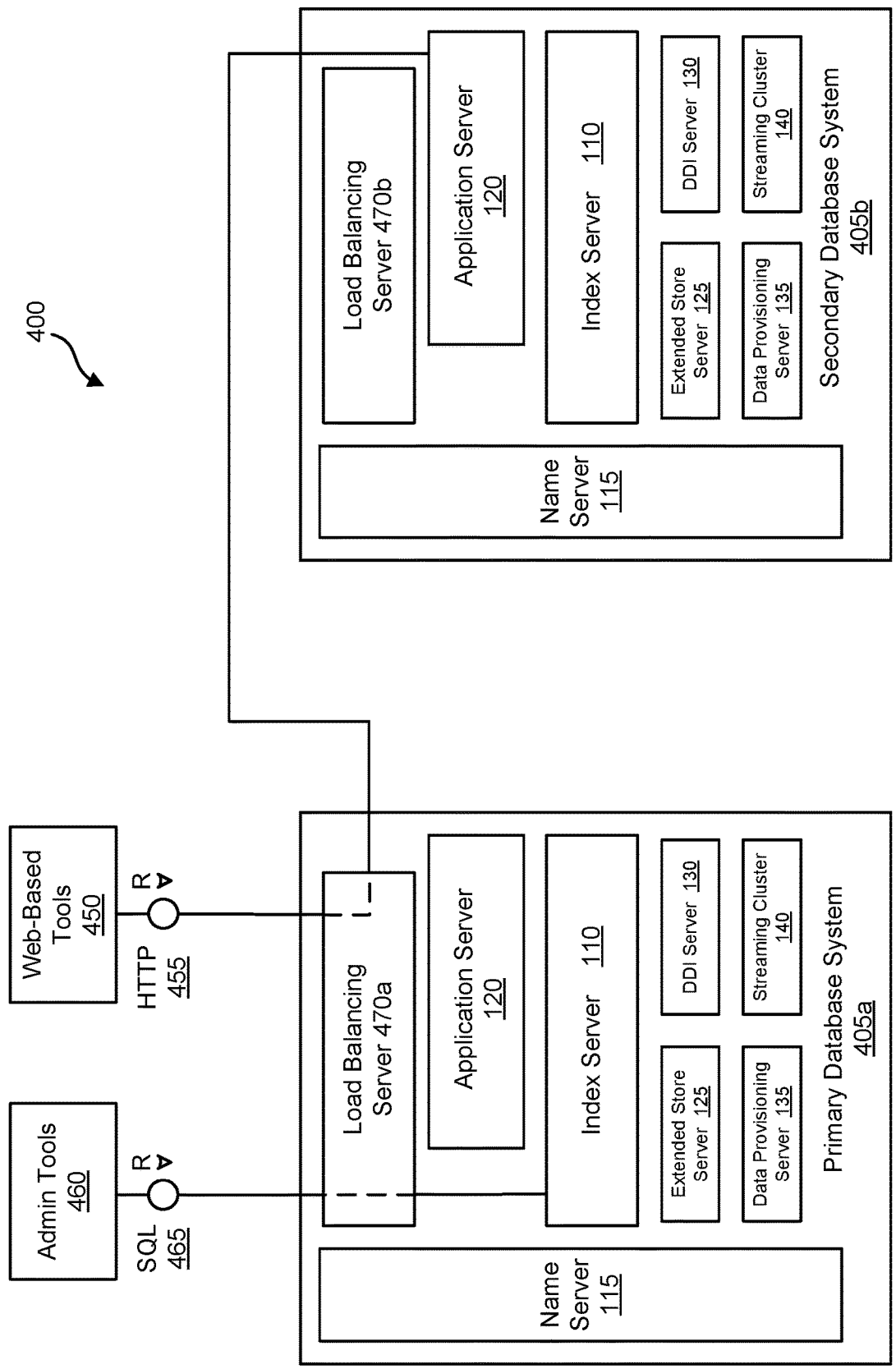
FIG. 4 is a system diagram illustrating an architecture for use in connection with a metadata catalog, which includes a primary database system and a secondary database system that serves as hot-standby to primary database system.

FIG. 4 is a system diagram illustrating an architecture 400 to support load balancing between a primary database system, or primary system 405a and a secondary database system, or secondary system 405b, which serves as hot-standby to primary system 405a, according to some embodiments. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g., 465, may perform a write transaction that is followed by a read transaction, e.g., 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
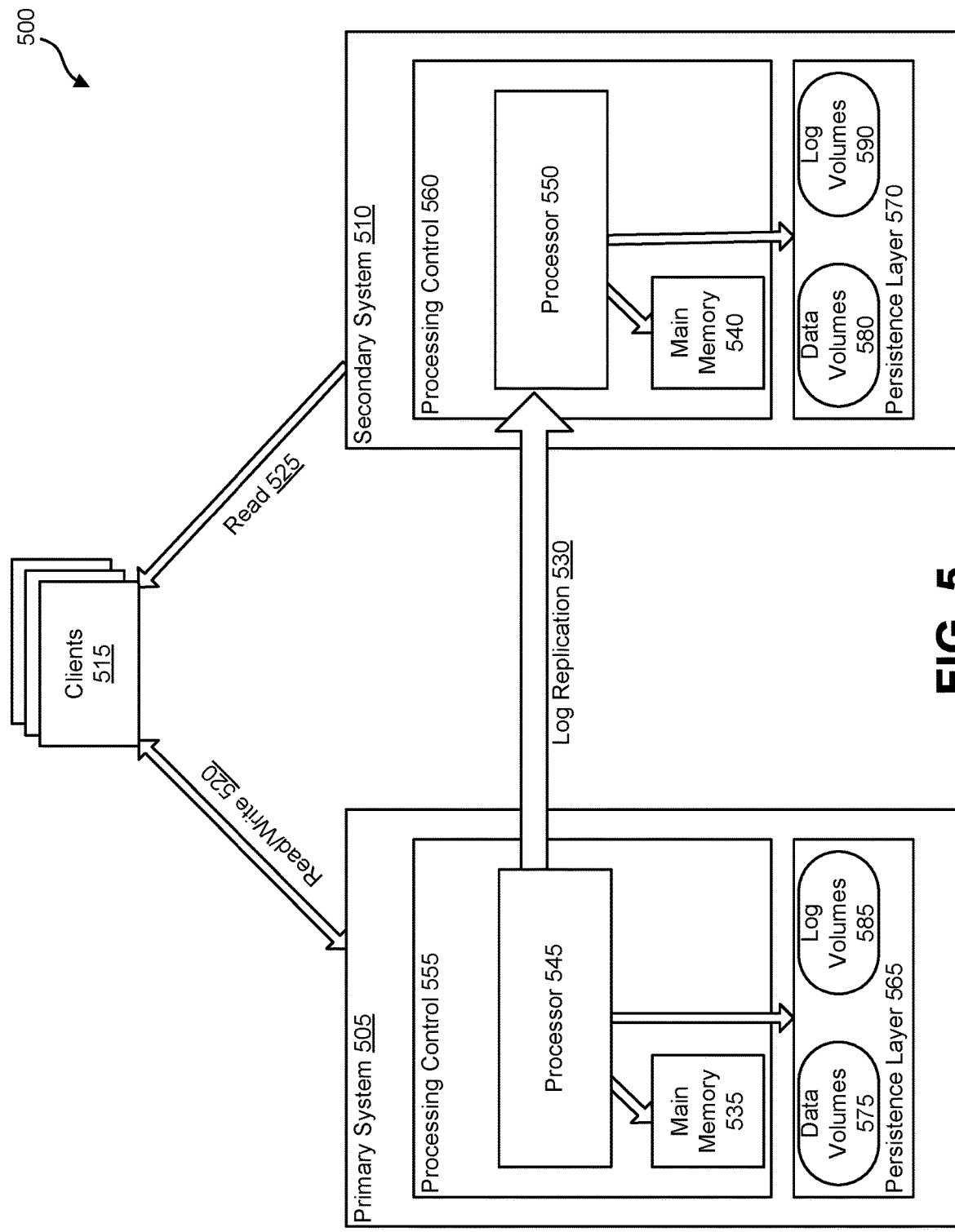
FIG. 5 is a system diagram illustrating a high-availability/disaster-recovery (HA DR) database systems for use in connection with a metadata catalog.

FIG. 5 illustrates a HA/DR system 500 for use in connection with a metadata catalog, according to some embodiments HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. The time it takes after a disaster to restore full, or minimum, functionality of a data system, for example by bringing a hot-standby online, is referred to as recovery time. Secondary system 510 may be a hot-standby, ready to come online with minimal recovery time so as to minimize downtime. In an effort to minimize recovery time, and thereby downtime, in some embodiments, the secondary system in a state just short of fully operational. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. In some embodiments, secondary system 510 may be kept in a state substantially close to the same state as the primary system 505 such that the workload required by many operations can be supported by the secondary 510. The HA/DR system depicted in FIG. 5 typically requires separately implementing the primary system 505 and the secondary system 510. The primary system 505 and the secondary system 510 are then administered and run independently, thus requiring additional computer resources and cost. These are just a few of the issues to be addressed in order to provide a simpler and more cost-effective solution for testing a HA/DR architecture or database replication system in general. One or more solutions to these issues are now addressed.

Multi-Container System Architectures

Figure 6:
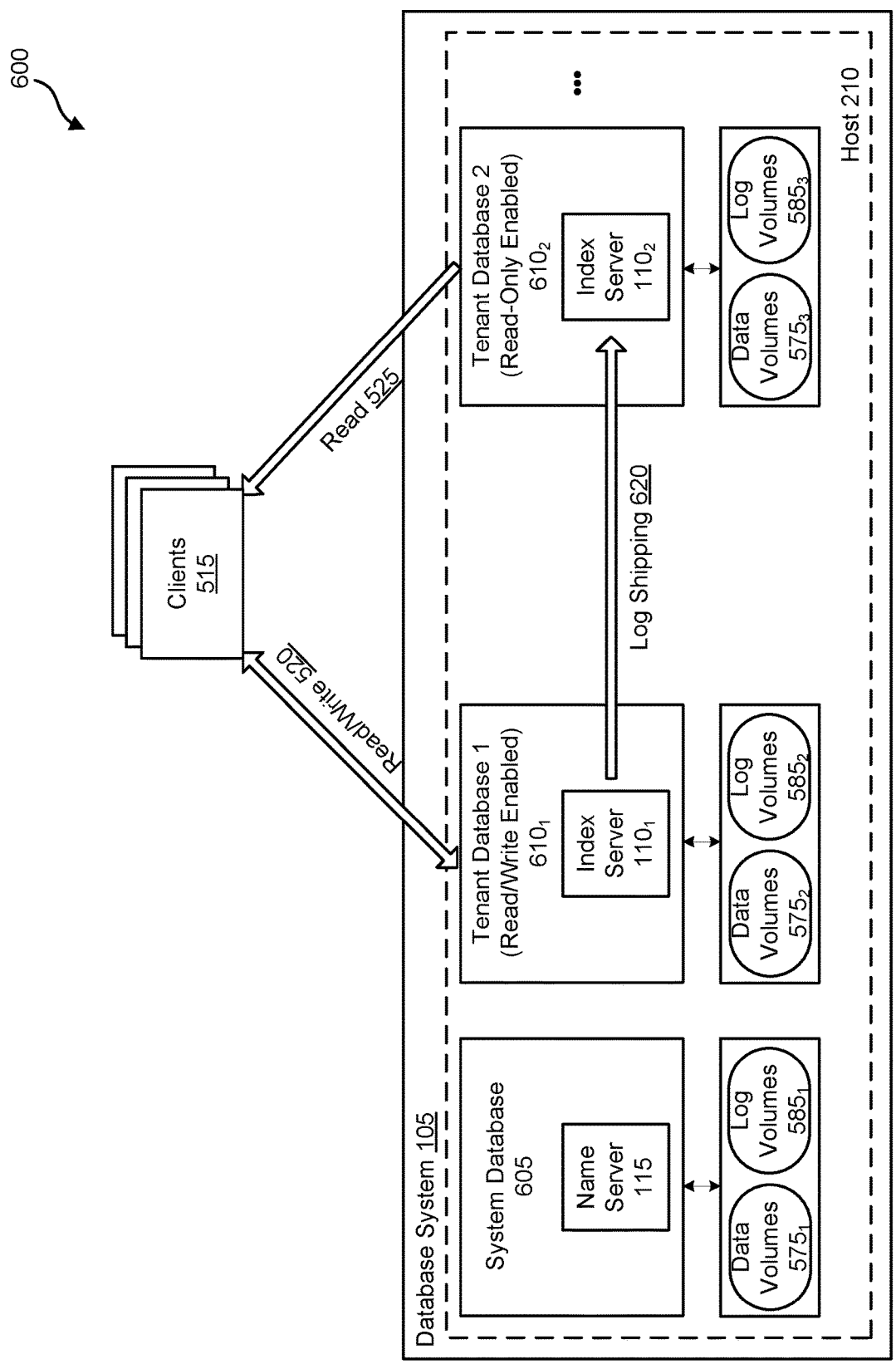
FIG. 6 is a system diagram illustrating a multi-container system architecture for testing a database replication system.

FIG. 6 is a system diagram illustrating a multi-container system architecture 600 for testing a database replication system, according to some embodiments. The multi-container system architecture 600 may be a single instance system, similar to database system 105 depicted in FIG. 1 (and as illustrated in FIG. 6), or may be a distributed variation of database system 105 as depicted in FIG. 2. The multi-container system architecture 600 can include a system database 605 and a plurality of tenant databases $610_{1-2}$. In some embodiments, the multi-container system architecture includes only one system database 605, used for central system administration, and any number of tenant databases (including zero).

Implementations of the multi-container system architecture 600 can include features of distributed architectures that provide multi-tenant container system support and data distribution that enables scalability. More specifically, the multi-component system architecture 600 allows hosting multiple "virtual" systems inside one physical system with isolation of the virtual systems from each other. The multi-component system architecture 600 is configured to support isolation of the plurality of tenant databases $610_{1-2}$ on a database level. In a multi-component system architecture, isolation can be achieved by having separate index servers $110_{1-2}$, separate disk volumes, and separate data volumes $575_{2-3}$ and log volumes $585_{2-3}$ for the different tenant databases. In some embodiments, each tenant databases $610_{1-2}$ can be served by a single index server that is configured to access data from each tenant database isolated from any other tenant database of the plurality of tenant databases $610_{1-2}$.

Thus, the multi-container system architecture 600 may be hosted by a single host 210, as depicted in FIG. 6, or by a plurality of hosts, and be distributed across multiple database server processes. In some embodiments, the system database 605 is hosted by one host, and the tenant databases run on a separate host. The multi-container system architecture 600 can be configured to run each tenant databases $610_{1-2}$, each isolated from one another and available to be accessed by clients 515 via a network, on a separate host, the same host, or across multiple hosts. A host 210 can be a virtual machine on a larger system or one or more physical processors. Tenant databases $610_{1-2}$ can also be distributed across multiple host processes. Data distribution means that tables or ranges within tables are assigned to different database partitions that are assigned to different host processes for scalability reasons.

It should be appreciated that the multi-container system architecture 600, as illustrated in FIG. 6, is only one example of such architectures for testing a database replication system, and that the architecture 600 optionally has more or fewer servers or components than shown, optionally combines two or more servers or components, or optionally has a different configuration or arrangement of the servers or components. The various servers or components shown in FIG. 6 are implemented in hardware, software, or a combination of both, the hardware and software, including one or more signal processing and/or application specific integrated circuits. Additional details regarding an example implementation of the architecture 600 are described and illustrated in connection with FIGS. 1-3.

The multi-container system architecture 600 may be useful to implement and test a database replication system, a high availability data system, or a disaster recovery system, or a combination HA/DR system. The architecture 600 can eliminate the need for a primary system and a secondary system, which are separate and stand-alone. The architecture 600, therefore, requires less computer resources than a two-system setup and is easier to implement and/or administer In some embodiments, the plurality of tenant databases $610_{1-2}$ includes a first tenant database $610_1$ that represents the primary system and a second tenant database $610_2$ that represents the secondary system. In one embodiment, the first tenant database $610_1$ is run in read/write access mode and the second tenant database $610_2$ configured to be read-only with respect to request received from clients 515, including client applications.

In some embodiments, the tenant databases $610_{1-2}$ are capable of sharing the same installation of the database system software, the same computing resources, and the same system administration. Each tenant database 610 may be self-contained and fully isolated from any other tenant database $610_{1-2}$ by having its own clients 515 or tenants, components, resources, including, for example, the index server 110, data volumes 575, log volumes 585, database catalog, repository, and persistence layer. Database objects, including schemas, tables, views, procedures, are generally localized within a tenant database $610_{1-2}$. In some cases, queries that are cross-database queries, including, for example, SELECT queries, can be executed across more than tenant database by accessing database objects from multiple tenant databases $610_{1-2}$. This allows for clients 515 to connect to multiple tenant databases $610_{1-2}$. The multi-container system architecture 600 can be identified by a single system identifier (SID). A database included in the architecture 660 can then be identified by the SID and the name of the database.

In some embodiments, a tenant database $610_{1-2}$ is a separate administrative unit within the database system 105, which can be independently started, stopped and backed up from other tenant databases. It can be used to separate independent clients 515 from each other within the same database system 105 by providing an isolated database space for user data and runtime. This isolation allows for minimal interference between the tenant database $610_{1-2}$, while they are sharing the same computing resources. In some embodiments, replicating the first tenant database $610_1$ results in the second tenant database $610_2$ having the identical structure and data as the first tenant database $610_1$. This embodiment allows testing whether changes in the data or state of the first tenant database $610_1$ are correctly transmitted and replayed on the second tenant database $610_2$. Upon decoupling the first tenant database $610_1$ from the second tenant database $610_2$, the latter is configured to independently apply changes to the data and the state of the first tenant database $610_1$ onto its replicated state.

The multi-container system architecture 600 can include at least one system database 605. The system database 605 can own the metadata of the architecture 600 and can also contain central metadata available to all other tenant databases $610_{1-2}$ for read access. Tenant databases $610_{1-2}$ can also have their own private metadata that can define tenant-dependent extensions in tenant-dependent tables that are based on standard tables defined by the central metadata. The tenant private metadata can also define tenant private tables. The system database 605 can contain tenant independent application data stored in tenant independent tables that can be read by the tenant databases $610_{1-2}$. In some embodiments, each tenant database of the tenant databases $610_{1-2}$ is isolated from any other tenant database so that data from such tenant database cannot be accessed by any other tenant database. If a client 515 needs access to more than one tenant database (for example, to manage these tenant database), it needs to open separate database connections to each index server $110_{1-2}$ associated with the tenant databases $610_{1-2}$. To improve tenant isolation, each tenant database can be assigned to its own transaction domain to ensure that a transaction is restricted to one tenant database 610 and that a single transaction cannot span multiple tenant databases.

The system database 605 is created during either installation of a multiple-container system architecture or conversion from a single-container system to a multi-container system architecture 600. The system database 605 contains information about the architecture 600 as a whole and the architecture's plurality of tenant databases 610. In some embodiments, the multiple-container system architecture includes only one system database 605. The system database 605 can be used for central administration of the architecture 600 by, for example, providing data and users for system administration and being capable to connect to administration tools, such as SAP HANA cockpit or the SAP HANA studio. Administration tasks performed in the system database apply to the system as a whole and all of its databases (for example, system-level configuration settings), or can target specific tenant databases (for example, backup of a tenant database). Each tenant database 610 runs its own index server 110. Servers, including, for example, a compile server and a preprocessor server, that do not persist data run on the system database and serve all databases of the architecture 600.

In the embodiment illustrated in FIG. 6, only the system database 605 runs the name server 115. The system database 605 stores overall landscape information about the architecture 600, including information regarding the tenant databases 610 that exist within the architecture 600. For example, the information accessible by the name server 115 includes the assignment of the index servers $110_{1-2}$ to particular tenant databases $610_{1-2}$. In some embodiments, the system database 605 does not include nor own database-related topology information, which includes information about the location of tables and table partitions included in the tenant databases 610. In another embodiment with data distribution, the name server 115 has access to information about which tables or partitions of tables are located on which tenant database $610_{1-2}$.

Database-related topology information is stored in the corresponding tenant database catalogs. The name server 115 may also provide index server functionality for the system database 605. Unlike the name server in a single-container system, the name server 115 of the system database 605 within a multiple-container system does not own topology information, that is, information about the location of tables and table partitions in databases.

The system database 605 is a central database within a multi-container system architecture 600 that includes information about the database system 105, including the global system state and metadata and state of the tenant database $610_{1-2}$. In some embodiments, the system database 605 is used for administration purposes of the database system 105, but not for storing user data, which is instead stored in the tenant database $610_{1-2}$.

One example of testing database replication in the multi-container system architecture 600 includes generating and writing logs at the first tenant database $610_1$, which represents the primary system. The logs represent the current state of data and metadata, including, for example, data stored in the data volumes $575_2$ and log volumes $585_2$ or in-memory data, at the first tenant database $610_1$. The logs are transmitted (shipped) 620 from the first tenant database $610_1$ to the second tenant database $610_2$, which represents the secondary system. They are subsequently stored and replayed at the second tenant database $610_2$ to replicate the state of the first tenant database $610_1$.

In some embodiments, the second tenant database $610_2$ is generated by replicating information associated with the first tenant database $610_1$, and storing the replicated information in the second tenant database $610_2$. The replicated information may include, for example, data pages used to transfer the initial data state of the first tenant database $610_1$, log buffers representing online data changes, metadata about the current states of the tenant databases $610_{1-2}$ or any combination thereof.

The logs can include transaction logs and metadata logs in the form of logical, physical, or any similar log type. The multi-container system architecture 600 allows a developer to test transmissions of log information between the first tenant databases $610_1$ as the primary and the second tenant databases $610_2$ as the secondary system for load balancing and disaster recovery purposes.

A developer can test the recovery mode of a database system by sending a request to the first tenant database $610_1$ to enter a recovery mode. Upon the first tenant database $610_1$ entering a recovery mode, a metadata log is retrieved from the log volumes $585_2$ and transmitted to the second tenant database $610_2$ to replay the metadata log. By replaying the metadata log at the second tenant database $610_2$ a metadata catalog of the transmitted metadata objects is generated at the second tenant database $610_2$.

Transmission modes, which include, for example, synchronous, asynchronous, and fully synchronous, in memory and outside of memory, continuously or discrete, and similar modes can be tested with the architecture 600. In one embodiment, the tested transmission includes continuously asynchronous log replay into memory and persistence structures contained with second tenant databases $610_2$ mimicking the secondary system 610. The transmitted metadata logs are received by the second tenant databases $610_2$ and are replayed by the second tenant databases $610_2$ in the order that the metadata logs were transmitted by the first tenant databases $610_1$.

In another testing example, upon accessing metadata objects in the metadata layers in each index server of the plurality of index servers $110_{1-2}$, the persistence server writes changes in persistent data to the persistent volume based on the changes to metadata objects in the metadata layer. Additional details regarding an example implementation of the persistence volume as part of the persistence layer are described and illustrated in connection with the diagram 300 in FIG. 3.

In yet another example, a developer is able to test read access to the second tenant databases $610_2$. This can be done by sending a request to the second tenant databases $610_2$ and executing SELECT queries included in the request at the second tenant databases $610_2$. The results generated in response to executing the SELECT queries on the second tenant databases $610_2$ are based on data that has already been replayed on the second tenant databases $610_2$, and is, therefore, visible to the client 515 or client applications connected to the second tenant databases $610_2$.

Figure 7:
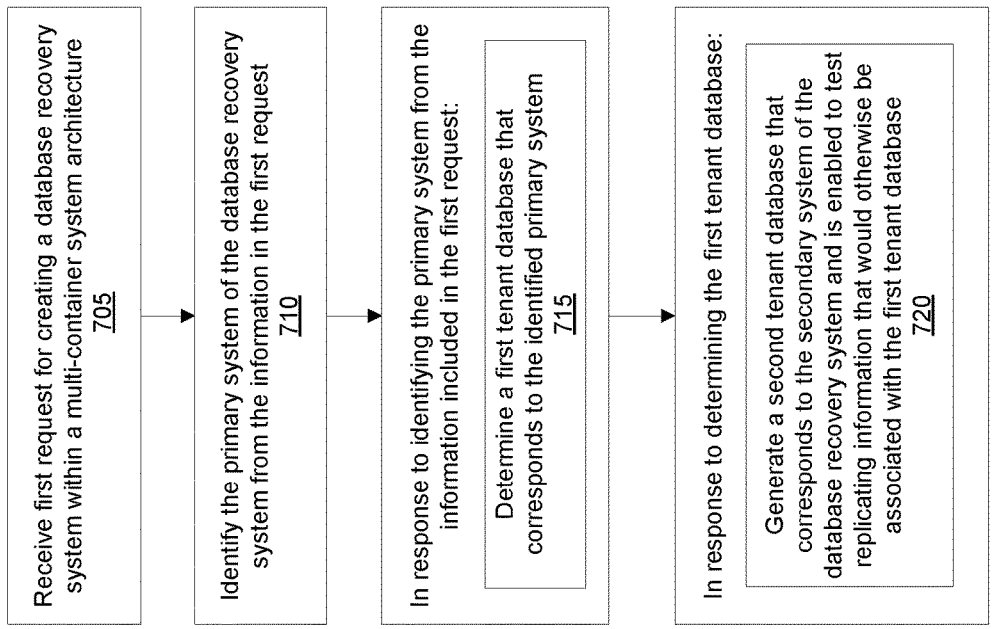
FIG. 7 is a process flow diagram illustrating testing a database replication system within a multi-container system architecture.

FIG. 7 is a process flow diagram illustrating testing a database replication system within a multi-container system architecture, according to some embodiments. In some embodiments, a first request is received 705 for creating a database recovery system within a multi-container system architecture. The multi-container system architecture is configured to contain a plurality of tenant databases and a system database, and the database recovery system includes a primary system and a secondary system. The primary system is then identified 710 from the information in the first request. In response to identifying the primary system from the information included in the first request, a first tenant database included in the plurality of tenant databases is determined 715 that corresponds to the identified primary system. In response to determining the first tenant database, a second tenant database of the plurality of tenant databases is generated 720 that corresponds to the secondary system and is enabled to test replicating information that would otherwise be associated with the first tenant database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well, for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B," "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for testing a database replication system within a multi-container system architecture, the method comprising:

receiving a first request for creating a database recovery system within a multi-container system architecture, the multi-container system architecture comprising a computing device having a plurality of tenant databases and a system database;

identifying a primary system of a database system from information included in the first request;

in response to identifying the primary system from the information included in the first request, determining a first tenant database of the plurality of tenant databases, the first tenant database representing the identified primary system;

in response to determining the first tenant database, generating a second tenant database of the plurality of tenant databases, the second tenant database representing a secondary system of the database system and being enabled to test replicating information that would otherwise be associated with the first tenant database, wherein the primary system and the secondary system each comprise a computing device independent of the computing device of the multi-container system architecture;

receiving, by the first tenant database, a request to enter a recovery mode;

upon entering the recovery mode, retrieving log information from the first tenant database for transmission to the second tenant database; and generating a log catalog comprising transmitted objects from the first tenant database to the second tenant database by replaying the log information at the second tenant database.

2. The method of claim 1, further comprising:
receiving a second request for accessing the secondary system;
in response to receiving a second request for accessing the secondary system, executing the second request; and
outputting results of the executing the second request;
wherein the executing the second request is based at least in part on data included in the second tenant database.

3. The method of claim 2, wherein the executing the second request is based at least in part on information included in the system database.

4. The method of claim 1, further comprising:
receiving a third request for accessing the primary system;
in response to receiving a third request for accessing the primary system, executing the third request; and
outputting results of the executing the third request;
wherein the executing the third request is based at least in part on data included in the first tenant database.

5. The method of claim 4, wherein the executing the third request is based at least in part on information included in the system database.

6. The method of claim 1, wherein the log information comprises a metadata log.

7. The method of claim 6, wherein the log catalog is a metadata catalog and the transmitted objects are transmitted metadata objects.

8. The method of claim 1, wherein the generating the multi-container system architecture comprises generating the system database and the first tenant database.

9. The method of claim 1, wherein the generating the second tenant database of the plurality of tenant databases comprises replicating information associated with the first tenant database, and storing the replicated information in the second tenant database.

10. The method of claim 9, wherein the replicated information comprises data pages, log buffers and metadata or any combination thereof.

11. The method of claim 1, wherein the multi-container system architecture comprises a plurality of index servers including a first index server and a second index server, and wherein the first index server hosts the first tenant database, and the second index server hosts the second tenant database.

12. The method of claim 11, wherein the first index server stores topology information associated with the first tenant database, and the second index server stores topology information associated with the second tenant database.

13. The method of claim 12, wherein the topology information associated with a tenant database of the plurality of tenant databases includes: information corresponding to tables associated with the tenant database, and information corresponding to table partitions associated with the tenant database.

14. The method of claim 1, wherein the multi-container system architecture comprises a name server, and wherein the name server hosts the system database, stores information associated with the first tenant database, and stores information associated with the second tenant database.

15. The method of claim 14, wherein information stored in the name server includes landscape information associated with the multi-container system architecture.

16. The method of claim 14, wherein the information stored in the name server does not include topology information associated with a tenant database of the plurality of tenant databases.

17. The method of claim 1, wherein the first tenant database is configured to communicate with client applications through a read/write connection.

18. The method of claim 1, wherein the second tenant database is configured to communicate with client applications through a read-only connection.

19. A computer-implemented system for testing a database replication system within a multi-container system architecture, the system comprising:
a data processor of the multi-container system architecture;
a plurality of tenant databases and a system database of the multi-container system architecture, wherein the plurality of tenant databases represent separate, physical databases of a database system comprising a primary system and a secondary system; and
a computer-readable storage medium encoded with instructions for commanding the data processor to perform operations comprising:
receiving a first request for creating a database recovery system within the multi-container system architecture;
identifying the primary system from information included in the first request;
in response to identifying the primary system from the information included in the first request, determining a first tenant database of the plurality of tenant databases, the first tenant database representing the identified primary system;
in response to determining the first tenant database, generating a second tenant database of the plurality of tenant databases, the second tenant database representing the secondary system, wherein the primary system and the secondary system each comprise a computing device independent of the data processor of the multi-container system architecture;
receiving, by the first tenant database, a request to enter a recovery mode;
upon entering the recovery mode, retrieving log information from the first tenant database for transmission to the second tenant database; and
generating a log catalog comprising transmitted objects from the first tenant database to the second tenant database by replaying the log information at the second tenant database.

20. A computer program product for testing a database replication system within a multi-container system architecture, the product comprising:

a non-transitory machine-readable medium storing instructions that, when executed by at least one data processor, cause the at least one data processor to perform operations comprising:
generating a multi-container system architecture, the multi-container system architecture comprising a computing device having a plurality of tenant databases and a system database;
receiving a first request for creating a database recovery system within the multi-container system architecture;
identifying a primary system of a database system from information included in the first request;
in response to identifying the primary system from the information included in the first request, determining a first tenant database of the plurality of tenant databases, the first tenant database replicating the identified primary system;
in response to determining the first tenant database, generating a second tenant database of the plurality of tenant databases, the second tenant database replicating a secondary system of the database system, wherein the primary system and the secondary system each comprise a computing device independent of the computing device of the multi-container system architecture;
receiving, by the first tenant database, a request to enter a recovery mode;
upon entering the recovery mode, retrieving log information from the first tenant database for transmission to the second tenant database; and
generating a log catalog comprising transmitted objects from the first tenant database to the second tenant database by replaying the log information at the second tenant database.

* * * * *